3,677,840
PYROTECHNICS COMPRISING OXIDE OF SILVER FOR WEATHER MODIFICATION USE

Graham C. Shaw, Garland, and Russell Reed, Jr., Brigham City, Utah, assignors to Thiokol Chemical Corporation, Bristol, Pa.
No Drawing. Filed Sept. 18, 1969, Ser. No. 859,165
Int. Cl. C06d 3/00
U.S. Cl. 149—19                    5 Claims

ABSTRACT OF THE DISCLOSURE

A pyrotechnic composition which upon combustion produces mixed silver halide nuclei for use in influencing weather comprises a composition made by curing a mixture comprising silver oxide, an alkali iodate, an alkali perchlorate and a curable oxygenated or fluorinated organic liquid polymer binder. The composition burns smoothly to provide by metathesis a mixture of silver halides as substantially the only solid or condensed phase reaction products, and leaves substantially no residue. The reaction products form nuclei for causing nucleation of water in clouds.

BACKGROUND OF THE INVENTION

Field of the invention

The present invention relates to a substantially residue-free pyrotechnic composition which upon combustion provides a mixture of silver halides including, essentially, silver iodide nuclei for causing nucleation of water in clouds, e.g. for "cloud seeding," and for thereby influencing weather conditions.

Description of the prior art

Pyrotechnics useful for meterological seeding purposes are known. Such pyrotechnics are taught, for example, in U.S. Pats. 3,046,168; 3,140,207; 3,375,148; and 3,418,184. Pyrotechnic compositions described in these patents, upon combustion, produce silver iodide nuclei from silver iodate. However, chemical reduction of the silver iodate in such compositions to silver iodide may proceed, in part, further to reduction of the silver iodide to metallic silver, thereby diminishing the surface activity of the silver iodide particles for cloud seeding purposes.

SUMMARY OF THE INVENTION

The present invention provides a means for avoiding the above-described reduced activity of silver iodide as well as providing a means for producing nascent silver iodide by an advantageous method of metathesis.

The present invention is directed to providing a pyrotechnic composition for weather influencing purposes in which the silver-providing compound used to make the nuclei for nucleation purposes is an oxide of silver, preferably, silver oxide, $Ag_2O$. The oxide of silver is preferably used in combination with an alkali iodide anion-providing compound, preferably an iodate, e.g. ammonium iodate or potassium iodate. The iodate compound serves also as an additional source of oxygen for the combustion of the organic polymeric binder used in making the pyrotechnic composition.

The use of an oxide of silver as a source of the silver cation in silver iodide formed in the products of combustion of a pyrotechnic composition for cloud seeding purposes has not heretofore been known, particularly in combination with an alkali iodate which serves as the source of the iodide anion. Nascent silver iodide, which is formed in the highly oxidizing environment of the combustion, is the product of a metathesis reaction. Therefore, the silver iodide of the invention is obtained in a highly active form ideally suited for nucleating purposes.

The metathesis reaction proceeds substantially according to the following equation:

$$Ag_2O + 2NH_4IO_3 \rightarrow 2AgI + 2NH_3 + H_2O + 3O_2$$

In accordance with the invention, the pyrotechnic composition comprises, by weight, the cured product produced by mixing and curing together from about 0.5% to about 20% of oxide of silver; from about 2% to about 45% of an alkali iodate present in about a stoichiometric amount relative to the amount of oxide of silver present in the composition; from about 25% to about 75% of a solid inorganic oxidizer selected from the perchlorates and the nitrates of ammonium and of Group I-A and Group II-A metals of the Periodic Table; and from about 10% to about 20% of a curable, fluid polymer binder for pyrotechnic compositions, especially a combined-halogen-rich or combined-oxygen-rich polymer binder, preferably a polyester-urethane terminated with amine or hydroxyl groups.

DESCRIPTION OF THE PREFERRED EMBODIMENTS

The pyrotechnic compositions of the invention are prepared by compounding of the ingredients according to procedures known in the manufacutre of pyrotechnic compositions, using equipment and safety precautions usually used and necessary in carrying out the manufacturing procedures involved.

The following specific descriptions and illustrative examples set forth preferred embodiments of the invention. In the accompanying table are listed typical ingredients, and their amounts, which are used in preparing representative preferred pyrotechnic compositions according to the invention.

TABLE

| Example number | Percent by weight | | | | | |
|---|---|---|---|---|---|---|
| | 1 | 2 | 3 | 4 | 5 | 6 |
| Ingredients: | | | | | | |
| Silver oxide | 15 | 15.4 | | 0.5 | 20 | 5 |
| Silver peroxide | | | 16 | | | 5 |
| Ammonium perchlorate | 30 | 30.8 | 31 | 78.5 | 30 | 63 |
| Binder | ¹15 | ¹15.4 | ¹15 | ²20 | ³10 | ⁴15 |
| Ammonium iodate | | 38.4 | 38 | 1.0 | | 6 |
| Potassium iodate | 40 | | | | 40 | 6 |

¹ Polyester-urethane.
² Hydroxy-terminated polybutadiene.
³ Amine-terminated polypropyleneglycol.
⁴ Copolymer of vinylidene flouride and perfluoropropylene dissolved in 1,1,7-trihydroperfluoroheptyl acrylate.

The oxide of silver used in practicing the invention may be silver oxide ($Ag_2O$) or silver peroxide (AgO). Silver oxide is preferably used. The oxide of silver is used as a powder, preferably a powder having a particle size of from about 10 to about 250 microns in diameter.

In addition to the benefits derived from the advantageous use of oxide of silver because of the formation of nascent silver iodide, the use of the oxide of silver also is economically advantageous over use of silver iodate as the source of the silver cation for the nucleating function according to the invention in that the unit cost of silver iodide (AgI) prepared from the oxide is less than half that of AgI derived from the iodate.

The amount of oxide of silver present in the composition is preferably as great an amount as can be reasonably completely metathesized to AgI by the heat of combustion of the composition.

The iodate used in practicing the invention serves as the source of the iodide anion of the AgI. Accordingly, the iodate must be a compound which will decompose or react to liberate the iodide anion at the temperatures created during combustion of the pyrotechnic composition. Alkali iodates have been found especially suitable for this purpose. The iodates of ammonium and potassium are preferably used in the compositions of this invention. Other alkali iodates may also be used to obtain similar benefits and advantages. These include sodium iodate, lithium iodate, calcium iodate, and barium iodate. Because the amount of residue is particularly low when ammonium iodate is used as the source of the iodide anion, ammonium iodate is preferably used.

The amount of alkali iodate present in the composition preferably is at least a stoichiometric amount needed to combine with the amount of oxide of silver present to form a silver iodide.

The polymer of the curable polymer binder used in the composition may be any fluid polymer which has a high combined-oxygen or combined-halogen content and which further has physical properties such that it may be used in the propellant arts. A wide variety of suitable, curable, fluid polymers are known to the art and such polymers can be mixed with the other ingredients hereof to form the curable mixture. These include, for example, polyalkylhydrocarbons, e.g., polyethylene and polybutadiene, particularly amine- or hydroxyl-terminated polymers, and polyfluorocarbons. Examples of highly-oxygenated binders, which are preferred, include polyethers and polyesters terminated in hydroxyl or isocyanate groups. Polyethers used include polyols derived from polymerization of ethylene, propylene, and butylene oxide and tetrahydrofuran. These may also be isocyanate terminated by reaction with di- or tri-functional isocyanates such as toluene diisocyanate, isophorone diisocyanate, and arylmethylene isocyanates. Polyesters, hydroxyl-terminated, include those derived from esterification of high-oxygen-content acids such as succinic, glutaric, adipic, and citric. The diols used include ethylene, diethylene, triethylene, propylene and butylene glycols.

Other suitable, curable, fluid polymeric binders will be found among those described in U.S. 3,235,589, U.S. 3,257,801, U.S. 3,260,208, U.S. 3,158,991, and U.S. 3,068,129, all incorporated herein by reference.

The amount of binder present in the composition should be at least sufficient to form a castable, fluid mass with the solid ingredients and to bind the ingredients into a tough, solid mass when the binder is cured. An additional amount of the polymeric binder may be used, as is known in the pyrotechnic art, to serve as the fuel component to burn with the oxidizer components of the composition. Both the alkali iodate and the solid inorganic oxidizer used in the composition serve as oxidizers. The stoichiometric balance needed among these components will be readily determinable by one skilled in the art of formulating pyrotechnic compositions.

Solid inorganic oxidizers employed in the pyrotechnic compositions of this invention can be compounds such as ammonium and metal perchlorates and ammonium and metal nitrates. The perchlorates employed as oxidizing agents or oxygen carriers in the compositions are anhydrous and have the general formula $M(ClO_4)_x$, wherein M is $NH_4$ or a metal, and $x$ is the valence of M, and ordinarily has a value of 1 or 2. Since the pyrotechnic composition is required to withstand high temperature storage, it is preferable that the melting point and the decomposition temperatures of the oxidizer be as high as possible. The perchlorates of ammonium and of the Group I-A and Group II-A metals are found to have the required high temperature stability and are employed in the preparation of pyrotechnic composition for use in practice of this invention. The metal perchlorates used in the preparation of the compositions include lithium perchlorate, sodium perchlorate, potassium perchlorate, rubidium perchlorate, and cesium perchlorate, which are the perchlorates of the metals of Group I-A of the Periodic Table of Elements; and magnesium perchlorate, calcium perchlorate, strontium perchlorate, and barium perchlorate, which are the perchlorates of the Group II-A metals. Of the metal perchlorates the compound potassium perchlorate is preferably used in the pyrotechnic compositions. Examples of the nitrates of the Group I-A and II-A metals which are employed in preparing compositions of this invention are compounds such as sodium nitrate, potassium nitrate, magnesium nitrate, calcium nitrate, barium nitrate, strontium nitrate, etc. Ammonium nitrate is also useful. Also, newer perchlorate compounds, particularly hydroxylammonium perchlorate, may be used.

The amount of solid inorganic oxidizer present in the composition preferably is at least an amount sufficient to combust completely the binder and to generate sufficient heat thereby to carry out the metathesis reaction between the oxide of silver and the alkali iodate.

In formulations where a metal iodate is present, e.g. barium iodate, it will be desirable in some cases to use finely-divided fuel metal in the formulation to aid in minimizing slag formulation, as taught, for example, in the use of iodate formulations of U.S. 3,418,184. The fuel metal ingredient, then, of the composition of this invention will be a particulate form, e.g. finer than about 100 mesh, of fuel metal, especially a powder of aluminum, magnesium, iron, zinc, titanium or zirconium. The powders may be used individually or admixed with each other. The fuel metal ingredient may also contain in admixture a minor amount of a non-metallic fuel powder, including powders of boron, tellurium and silicon. Aluminum and magnesium powders having a mesh size of less than 100 mesh U.S. Standard are preferred.

Other substances which are employed in the preparation of the pyrotechnic composition of this invention include minor amount of burning catalysts, well known in pyrotechnic compositions. These are composed of one or a mixture of two or more metal oxide powders in amounts sufficient to improve the burning rate of the composition. The amounts usually range from about 0.01 to about 3 weight percent, based on the weight of the oxidizer employed. The particle size of the powders can range from about 10 to about 250 microns in diameter. Non-limiting examples of metals that serve as burning catalysts are copper, vanadium, chromium, silver, molybdenum, zirconium, antimony, manganese, iron, cobalt, and nickel. Examples of metal oxide burning catalysts are ferric oxide, aluminum oxide, copper oxide, chromic oxide, as well as the oxides of the other metals mentioned above. Other burning rate catalysts which may be used will be found among those described in U.S. 2,969,638, incorporated herein by reference.

Curing catalysts are often added in minor amounts to cure the polymer in the curable composition of this invention. Non-limiting examples of catalysts used for this purpose are aluminum chloride, tristrimethylsilyl borate, benzoyl peroxide, and other catalysts well known in the curing of plastics, resins, polymers, and rubbers. Examples of various catalysts may be found in text books such as "Synthetic Rubber," by G. S. Whitley, pp. 892–933, 1954 ed., published by John Wiley and Sons, Inc., New York. The curing catalysts are added in amounts of from 0.1 to about 10 weight percent based on the weight of the polymer. The particular catalyst and amount employed depend on the state of cure desired, the nature of the polymeric material employed in the composition, and the heating and storage compatibility of the catalyst with the high explosive, fuel metal and oxidizer ingredients, as well as with the binder.

The blending of the ingredients in preparing the pyrotechnic composition is carried out at a temperature sufficiently high to maintain fluidity of the polymer binder ingredient but sufficiently low enough to minimize curing of the polymer binder in the blender. A temperature in the range of about 120 to 135° F. will usually be found suitable. The blending is carried out in accordance with known procedures for a period of time sufficient to homogeneously mix all the ingredients to form a putty-like mass which can be flowed upon application of moderate pressure or vacuum.

The curable pyrotechnic composition which results from the blending operation is deaerated and then is extruded or otherwise drawn or forced into a rocket, shell or flare cannister. Where the composition cures on standing for a period of several hours to several days at a temperature of about 135 to 150° F. depending on the type and amount of fluid polymer binder and curing agent therefor which is used. A suitable procedure for filling the tubes by means of vacuum is described in U.S. 3,341,-636, incorporated herein by reference.

The following examples further illustrate the invention.

EXAMPLE I

A curable, flowable pyrotechnic composition is prepared by blending together in a propellant mixer at 135–145° F. the following ingredients until a homogeneous flowable mixture is obtained:

| Ingredient: | Percent by weight |
|---|---|
| Liquid hydroxy-terminated polybutadiene polymer | 10.65 |
| Polyisocyanate such as isophorone diisocyanate | 2.35 |
| Silver oxide powder | 10.00 |
| Ammonium perchlorate powder | 60.00 |
| Ammonium iodate powder | 17.00 |

EXAMPLE II

The pyrotechnic composition made according to the method described in Example I is loaded into a dispersing means cannister similar to that of an aircraft parachute type drop flare and cured therein. The cannister is assembled into the parachute-type drop unit. To achieve the objective of the invention, the unit is dropped into a cloud bank from an aircraft and is ignited in the usual way. As the pyrotechnic composition burns, silver halides in the form of submicron sized silver iodide and silver chloride particles form and serve as nuclei for nucleating the water vapors in the cloud bank, causing rainfall.

EXAMPLE III 13.2 percent by weight of Morester 905 binder, a hydroxy terminated polyester, are mixed with 1.8 parts of PAPI (polymethylene polyphenylisocyanate). To this mixture are added 15 percent of silver oxide powder, 30 percent $KClO_4$ and 40 percent of $KIO_3$. This formulation is then thoroughly mixed at 135–145° F. until a flowable mixture is obtained. The mixture is then deaerated and cast into the dispersing cannister for use in a delivery munition according to the invention. The mixture is then cured to a solid, tough mass by heating to 135° F. for 24 hours. The mass has a specific gravity of 1.50 or greater. The pyrotechnic composition so made is then used to seed a cloud bank with silver halide nuclei to cause rainfall.

EXAMPLE IV 16 percent by weight of a liquid fluorocarbon binder (Viton A, 8–10%, a copolymer of vinylidene fluoride and perfluoropropylene dissolved in 1,1,7-trihydroperfluoroheptyl acrylate to which a catalytic amount, about 0.2%, of benzoyl peroxide has been added as a curing catalyst), 20 percent of silver oxide powder of about 100 mesh size, 30 percent of $NH_4ClO_4$, and 34 percent of $NH_4IO_3$ are mixed together at 125° F. for 20 to 30 minutes. The mixture is deaerated and flowed under pressure into dispersing cannisters. The formulation is cured at 135° F. for 24 hours. A tough, solid elastomeric mass is formed, having a specific gravity of 1.80 to 1.85. The pyrotechnic composition so made is ready for use in preparing a cloud seeding munition substantially as described above. The high combined-fluorine content of the fluorocarbon binder in this composition results in the formation of silver fluoride as well as silver iodide and silver chloride nuclei in the products of combustion during burning, thus further ensuring a minimum of slag formation.

Following the procedures described above, one skilled in the art will be able to prepare many suitable combinations of the disclosed ingredients to obtain the cured silver oxide-containing pyrotechnic composition essential for the practice of the invention. Thus, one may readily substitute silver peroxide for silver oxide, or other binders, e.g. epoxy curable hydroxy-terminated polybutadiene- or amine-terminated polypropylene glycol for the binders in the above examples to obtain the advantages and benefits thereof. Also, one may readily substitute other metal oxidizers and metal fuels, as described above.

The means for deploying the cloud seeding munition to its target will be obvious to those skilled in the munitions arts, whether as a rocket propelled projectile, a drop flare, or a mortar shell, or other device and therefore are not further described herein.

Although specific embodiments have been shown and described, it is to be understood that they are illustrative and are not to be construed as limiting on the scope and spirit of the invention.

We claim:

1. A pyrotechnic composition for producing silver iodide by metathesis for use in influencing weather, said composition comprising, by weight,
   - from about 0.5% to about 20% of an oxide of silver;
   - from about 2% to about 45% of a heat decomposable alkali iodate present in about a stoichiometric amount relative to the amount of oxide of silver present in the composition;
   - from about 25% to about 75% of a solid inorganic oxidizer selected from the perchlorates and the nitrates of Group I–A and Group II–A metals of the Periodic Table; and
   - from about 10% to about 20% of a polymer binder for pyrotechnic compositions present in at least a stoichiometric amount relative to amounts of the alkali iodate and solid inorganic oxidizer present in the composition.
2. The composition of claim 1 wherein the oxide of silver is silver oxide.
3. The composition of claim 1 wherein the iodate is selected from an iodate of ammonium, potassium, sodium, lithium, calcium and barium.
4. The composition of claim 1 wherein the iodate is ammonium iodate.
5. The composition of claim 1 wherein the binder is selected from a fluid, curable polyurethane, hydroxy-terminated polybutadiene, amine-terminated polypropylene glycol, and copolymer of vinylidene fluoride, perfluoropropylene dissolved in 1,1,7-trihydroperfluoroheptyl acrylate, hydroxy-containing polyethers, isocyanate-containing polyethers, hydroxy-containing polyesters, and isocyanate-containing polyesters.

References Cited

UNITED STATES PATENTS

| | | | |
|---|---|---|---|
| 2,995,526 | 8/1961 | De Ment | 149—81 X |
| 3,000,174 | 9/1961 | Vose | 149—87 X |
| 3,046,168 | 7/1962 | Burkardt et al. | 149—42 |
| 3,140,207 | 7/1964 | Williams et al. | 149—19 |
| 3,375,148 | 3/1968 | Finnegan et al. | 149—18 |
| 3,418,184 | 1/1968 | Vetter | 149—19 |
| 3,467,558 | 9/1969 | Wernette et al. | 149—19 |

CARL D. QUARFORTH, Primary Examiner

E. A. MILLER, Assistant Examiner

U.S. Cl. X.R.

149—61, 81, 83, 85